UNITED STATES PATENT OFFICE.

GUSTAV EDWARD JUNIUS, OF HAGEN, GERMANY, ASSIGNOR TO R. E. B. SANDERSON, OF NEW YORK, N. Y.

BLACK SULFUR DYE AND PROCESS OF MAKING SAME.

No. 901,970.     Specification of Letters Patent.     Patented Oct. 27, 1908.

Application filed October 24, 1906. Serial No. 340,365. (Specimens.)

*To all whom it may concern:*

Be it known that I, GUSTAV EDWARD JUNIUS, a subject of the German Emperor, and resident of Hagen, Westphalia, Germany, Bahnhofstrasse 29, have invented a certain new and useful Black Sulfur Dye and Process for Manufacturing the Same, of which the following is a specification.

I have found that if nitrosoorthocresol ($C_6H_3.CH_3.NO.OH$) is boiled with sulfid of sodium and sulfur in the presence of water a black sulfur dye is formed. Example: 7 parts of nitrosoorthocresol are mixed with 14 parts of crystallized sodium sulfid, 4 parts of sulfur and about 25 parts of cold water. The mixture is then slowly heated to boiling point and kept boiling until the liquor assumes a greenish-blue aspect; this takes about 24 hours. The volume of liquor is kept constant either by condensing the vapor that would otherwise escape and allowing it to flow back into the apparatus or by a supply of fresh water to compensate for that which evaporates. When the reaction is completed the solution may be used as a dye in the condition in which it then is; or the dye-solution may be evaporated to dryness; or the dye-stuff may be isolated by precipitation by an acid or by air or otherwise. The quantities of the above example produce a color which on cotton gives a black of a bluish shade; greenish-blue shades of black may be obtained by increasing the quantities of sulfur and sulfid. As the first result of the reaction is the formation of the sodium salt of nitroso-o-cresol, it is possible as an equivalent to replace part of the sodium sufid by a caustic alkali or by a carbonate of an alkali.

Part of the process may be carried out at a higher temperature in the form of what is technically known as a melt, but in every case water must be present at the commencement and the temperature must be low, as otherwise a decomposition of the nitroso-ortho-cresol might take place. However I prefer the boiling process as I find it gives a better shade. By this process the difficult manufacture of amidoorthocresol as an isolated intermediate product is dispensed with and a black is obtained which dyes cotton direct and which does not require an oxidation after-treatment with chromates or otherwise. In making dyes by this process, furthermore, it is necessary to use a nitrosocresol where the methyl-group is in the ortho-position.

The product, especially the one which gives a greenish shade of black, if dyed from a properly reduced solution, is faster to chlorin than other sulfur blacks known to me, and notably than the products known as T extra, immediate black NB, vidal black 4BS and generally blacks made from dinitrophenol.

Specially fast products are obtained by dividing the sulfuration into two parts; for instance by making first with little sulfur and sulfid a violet product which is afterwards purified by precipitating with acid and washing and is then treated again with sulfur and sulfid. Large quantities of sulfur and sulfid can be used in this case. However, it is advisable not to dry down the dye-solution but to isolate the coloring matter by precipitating either with acid or with a current of air blown through its solution. The thus precipitated and purified dye-stuff has the following properties: It is insoluble in water, acids and alkali carbonates, but is soluble in alkali-sulfids, such as sodium sulfid. It dyes cotton directly in a bath containing sodium sulfid and salt. The dyeings are fast to light, milling and alkalis, acids and cross dyeing.

I claim,—

1. The process of preparing a black dye-stuff which consists in treating nitrosoorthocresol with sodium sulfid and sulfur in the presence of water, substantially as described.

2. The dyestuff formed by treating nitroso-ortho-cresol with sodium sulfid and sulfur in the presence of water and characterized in the isolated and purified state by being insoluble in water, acids and alkali carbonates, but soluble in alkali sulfid, such as sodium sulfid; and by dyeing cotton directly in a bath containing sodium sulfid and salt, substantially as described.

3. The process of preparing a black dye-stuff which consists in boiling a bath of water containing nitroso-ortho-cresol, sodium sulfid and sulfur, substantially as described.

In testimony whereof I have signed my name to this specification in the presence of two subscribing witnesses.

GUSTAV EDWARD JUNIUS.

Witnesses:
MAX JUNIUS,
H. C. COXE.